US012769132B2

(12) United States Patent
Lajunen et al.

(10) Patent No.: US 12,769,132 B2
(45) Date of Patent: Oct. 20, 2026

(54) DISPLAY STRUCTURE, DISPLAY DEVICE, AND VEHICLE

(71) Applicant: DISPELIX OY, Espoo (FI)

(72) Inventors: Hanna Lajunen, Joensuu (FI); Toni Saastamoinen, Joensuu (FI)

(73) Assignee: DISPELIX OY, Espoo (FI)

( * ) Notice: Subject to any disclaimer, the term of this patent is extended or adjusted under 35 U.S.C. 154(b) by 232 days.

(21) Appl. No.: 18/716,870

(22) PCT Filed: Nov. 21, 2022

(86) PCT No.: PCT/FI2022/050773
§ 371 (c)(1),
(2) Date: Jun. 5, 2024

(87) PCT Pub. No.: WO2023/105115
PCT Pub. Date: Jun. 15, 2023

(65) Prior Publication Data

US 2025/0035930 A1 Jan. 30, 2025

(30) Foreign Application Priority Data

Dec. 7, 2021 (FI) .................................... 20216248

(51) Int. Cl.
*G02B 27/01* (2006.01)
*B60K 35/23* (2024.01)
*G02B 27/00* (2006.01)

(52) U.S. Cl.
CPC .......... *G02B 27/0172* (2013.01); *B60K 35/23* (2024.01); *G02B 27/0081* (2013.01); *G02B 27/0101* (2013.01); *B60K 2360/33* (2024.01); *G02B 2027/0123* (2013.01); *G02B 2027/0178* (2013.01)

(58) Field of Classification Search
CPC ........... G02B 27/0172; G02B 27/0081; G02B 27/0101; G02B 2027/0123; G02B 2027/0178; B60K 35/23; B60K 2360/33
See application file for complete search history.

(56) References Cited

U.S. PATENT DOCUMENTS

| | | | | |
|---|---|---|---|---|
| 2018/0081176 A1* | 3/2018 | Olkkonen | ........... | G02B 6/0016 |
| 2019/0212557 A1* | 7/2019 | Waldern | ............. | G02B 27/0101 |
| 2022/0214494 A1* | 7/2022 | Levola | ................. | G02B 6/0075 |
| 2024/0019698 A1* | 1/2024 | Crosby | ................ | G02B 5/1819 |

* cited by examiner

*Primary Examiner* — Jia X Pan
(74) *Attorney, Agent, or Firm* — Maschoff Brennan

(57) ABSTRACT

A display structure, a display device, and a vehicle are disclosed. The display structure comprises a waveguide; an in-coupling structure configured to in-couple a set of in-coupled beams; a diffractive exit pupil expansion structure configured to receive and diffract the set of in-coupled beams to form a first set of guided beams and a second set of guided beams; and a diffractive out-coupling structure configured to receive from the exit pupil expansion structure a first diffracted set of beams and a second diffracted set of beams and to out-couple light from the first diffracted set of beams and from the second diffracted set of beams.

15 Claims, 3 Drawing Sheets

DISPLAY STRUCTURE, DISPLAY DEVICE, AND VEHICLE

FIELD OF TECHNOLOGY

This disclosure concerns display devices. In particular, this disclosure concerns waveguide-based display structures, display devices comprising such display structures, and vehicles comprising such display devices.

BACKGROUND

Generally, a small form factor is essential for various portable displays and for vehicular displays. Displays with reduced form factors may be realized by utilization of waveguide-based structures for guiding light from the optical engines of such displays towards the users' eye (s).

Since the images produced by typical optical engines are relatively small, exit-pupil-expansion methods based on pupil replication are commonly used to increase the sizes of output images in conventional waveguide-based displays. In conventional exit-pupil-expansion methods, a light beam is coupled into a waveguide such that it propagates towards a first direction through an exit pupil expansion structure, e.g., a diffraction grating or a succession of beam splitters, and the exit pupil expansion structure forms a plurality of light beams propagating towards a second direction perpendicular to the first direction. Light from such plurality of light beams is then coupled out of the waveguide to form an output image.

Although such conventional methods have been successfully utilized for generation of various portable and vehicular displays, the optical losses caused by typical exit pupil expansion structures may be excessively high. Such losses may to some extent be reduced by increasing the efficiency at which an exit pupil expansion structure reflects or diffracts in-coupled light. However, simply increasing the efficiency of an exit pupil expansion structure may result in brightness non-uniformities in an output image.

In light of this, it may be desirable to develop new solutions related to display devices.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect, a display structure is provided. The display structure comprises a waveguide; an in-coupling structure configured to couple a set of input beams into the waveguide as a set of in-coupled beams associated with a set of in-coupled k-vectors defining a first domain in k-space in an annular guided propagation domain associated with the waveguide; and a diffractive exit pupil expansion structure configured to receive the set of in-coupled beams and to diffract the set of in-coupled beams to form a first set of guided beams and a second set of guided beams associated with a first set of k-vectors and a second set of k-vectors, respectively, lying in the first domain and in a second domain disjoint with the first domain, respectively. The display structure further comprises a diffractive out-coupling structure configured to receive from the exit pupil expansion structure a first diffracted set of beams and a second diffracted set of beams associated with a first diffracted set of k-vectors and a second diffracted set of k-vectors, respectively, lying in the first domain and the second domain, respectively, and the out-coupling structure is configured to couple light from the first diffracted set of beams and light from the second diffracted set of beams out of the waveguide.

According to a second aspect, a display device comprising a display structure in accordance with the first aspect is provided.

According to a third aspect, a vehicle comprising a vehicular display device in accordance with the second aspect is provided.

BRIEF DESCRIPTION OF THE DRAWINGS

The present disclosure will be better understood from the following detailed description read in light of the accompanying drawings, wherein.

Figure 1:
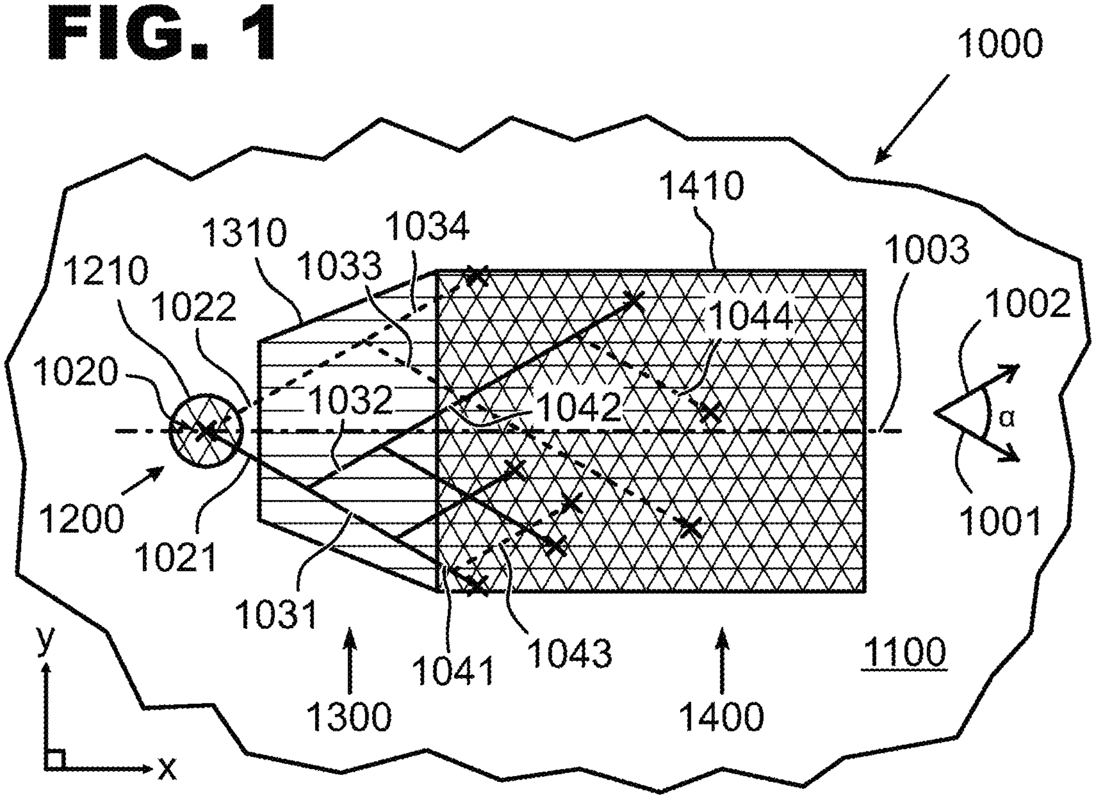
FIG. 1 shows a partial orthographic top view of a display structure.

Unless specifically stated to the contrary, any drawing of the aforementioned drawings may be not drawn to scale such that any element in said drawing may be drawn with inaccurate proportions with respect to other elements in said drawing in order to emphasize certain structural aspects of the embodiment of said drawing.

Moreover, corresponding elements in the embodiments of any two drawings of the aforementioned drawings may be disproportionate to each other in said two drawings in order to emphasize certain structural aspects of the embodiments of said two drawings.

DETAILED DESCRIPTION

Concerning display structures and display devices discussed in this detailed description, the following shall be noted.

In this specification, a "display device" may refer to an operable output device, e.g., electronic device, for visual presentation of images and/or data. A display device may generally comprise any part(s) or element(s) necessary or beneficial for visual presentation of images and/or data, for example, a power unit; an optical engine; a combiner optics unit, such as a waveguide-based combiner optics unit; an eye tracking unit; a head tracking unit; a gesture sensing unit; and/or a depth mapping unit. A display device may or may not be implemented as a see-through display device and/or as a portable display device and/or a vehicular display device.

Herein, a "see-through display device" or "transparent display device" may refer to a display device allowing its user to see the images and/or data shown on the display device as well as to see through the display device.

Herein, a "portable display device" may refer to a display device configured to be easily transportable and/or configured to be carried and/or worn.

Further, a "vehicular display device" may refer to a display device configured for use in a vehicle, for example, while operating said vehicle. Additionally or alternatively, a vehicular display device may refer to a display device configured to present images and/or data associated with a vehicle and/or operation thereof. Generally, a vehicular display device may or may not be implemented as a vehicle-mounted display device fixed to a vehicle.

Throughout this disclosure, a "display structure" may refer to at least part of an operable display device. Additionally of alternatively, a display structure may refer to a structure suitable for use in a display device.

Throughout this specification, a "k-vector", or "wave vector" may refer to a vector in k-space. Additionally or alternatively, a k-vector may represent an optical beam, i.e., a ray of light, with a specific propagation direction. Generally, a k-vector associated with an optical beam propagating in a medium may have a magnitude defined by an (angular) wavenumber defined as $$k = n\frac{2\pi}{\lambda_0},$$

wherein n is the refractive index of the medium and $\lambda_0$ is the wavelength of the optical beam in vacuum. As is evident based on the equation above, optical beams with shorter wavelengths have k-vectors with higher magnitudes. Additionally, a k-vector may point in the propagation direction of the optical beam that it represents. In light of the above, a k-vector (k) may be defined as $k=k\hat{v}$, wherein k is the wavenumber of the optical beam and $\hat{v}$ is a unit vector pointing in the propagation direction of the optical beam.

Herein, "k-space", or "angular space", may refer to a framework, wherein spatial frequency space analysis is used to relate k-vectors to geometrical points. Additionally or alternatively, k-space may refer to a two-dimensional projected space associated with a waveguide. In k-space, any diffraction event occurring while light propagates in a waveguide can be represented as a translation. Using the k-space formalism, the operation of a display structure may be described by the manner in which said display structure causes a set of input k-vectors to move in k-space.

Generally, in an unbounded homogeneous medium, all propagation directions are permitted, and the magnitudes of all k-vectors of a given wavelength are the same. As such, permitted k-vectors of a given wavelength in an unbounded homogeneous medium define a hollow sphere in k-space with a radius defined by the common wavenumber of the k-vectors. Since the common wavenumber of the k-vectors is proportional to the refractive index of the medium, the radius of the hollow sphere is also proportional to the refractive index of the medium.

However, in a homogeneous waveguide extending along a plane, permitted k-vectors of a given wavelength are commonly represented by a solid disk with a radius defined by the common wavenumber of the k-vectors. Such representation may be viewed as a projection of the previously described hollow sphere onto a plane in k-space corresponding to the plane along which the waveguide extends. Every point within the boundary of the solid disk corresponds to two permitted k-vectors having components perpendicular to the plane opposite to one another. For example, in case of a homogeneous waveguide extending along the x-y plane, the out-of-plane component of $k_z$ of a k-vector with a wavenumber k is given by $$k_z = \pm\sqrt{k^2 - k_x^2 - k_y^2},$$

wherein $k_x$ and $k_y$ are the magnitudes of the x- and y-components of the k-vector, respectively. Similarly to the case in unbounded homogeneous medium, the radius of the solid disk is proportional to the refractive index of the waveguide.

Typically, not all k-vectors permitted in a waveguide are guided in the waveguide. A waveguide is commonly surrounded by a medium having a refractive index less than that of the waveguide. Generally, a separate solid disk may be defined to represent permitted k-vectors in such medium. Since the refractive index of the surrounding medium is less than that of the waveguide, the solid disk associated with the surrounding medium has a radius less than that of the solid disk associated with the waveguide.

In general, an annular domain in k-space defined by the relative complement of such smaller solid disk in such larger solid disk, i.e., the difference of the larger solid disk and the smaller solid disk, may be referred to as a "guided propagation domain" associated with a waveguide. All k-vectors with in-plane components lying within such guided propagation domain of a waveguide may propagate in said waveguide in guided manner.

As stated above, the smaller solid disk represents permitted k-vectors in a medium surrounding a waveguide. Since light to be coupled into or out of a waveguide must be able to propagate in such surrounding medium, only k-vectors with in-plane components lying within such smaller solid disk may be coupled into or out of a waveguide. Consequently, the smaller solid disk representing permitted k-vectors in a medium surrounding a waveguide may be referred to as a "coupling domain" associated with said waveguide.

In light of the above, k-vectors permitted in a waveguide can be depicted in k-space using a two-dimensional k-vector diagram. Herein, a "k-vector diagram" may refer to a depiction of k-space, wherein guided propagation angles for optical beams propagating in a waveguide are represented by an annular guided propagation domain associated with said waveguide. Additionally or alternatively, a k-vector diagram may refer to a depiction of k-space, wherein non-guided propagation angles of optical beams propagating in a waveguide are represented by a coupling domain associated with said waveguide.

Generally, the outer radius of a guided propagation domain may be inversely proportional to wavelength of light such that light of lower wavelength may be associated with a wider guided propagation domain. Although the width of a guided propagation domain may influence the range of k-vectors that may be guided in a waveguide, a non-dispersive waveguide may still not be generally able to support a wider field of view with lower wavelengths. This may be due to the angular extent of a field of view being inversely proportional to wavelength. In light of this, k-vector diagrams are typically normalized such that a solid disk associated with propagation in vacuum is depicted with unity radius, i.e., the plots are normalized by dividing each k-vector by its wavenumber in vacuum ($k_o$), i.e., by $k_0=\lambda_o/2n$.

Figure 2:
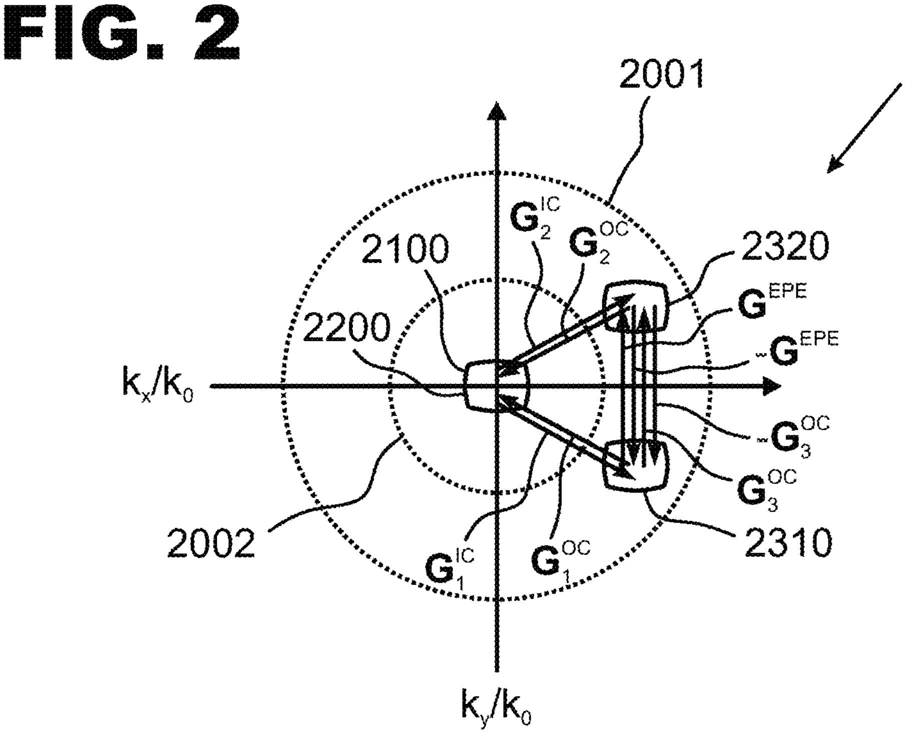
FIG. 2 depicts a normalized k-vector diagram 2000 illustrating the operating principles of the display structure.
Figure 3:
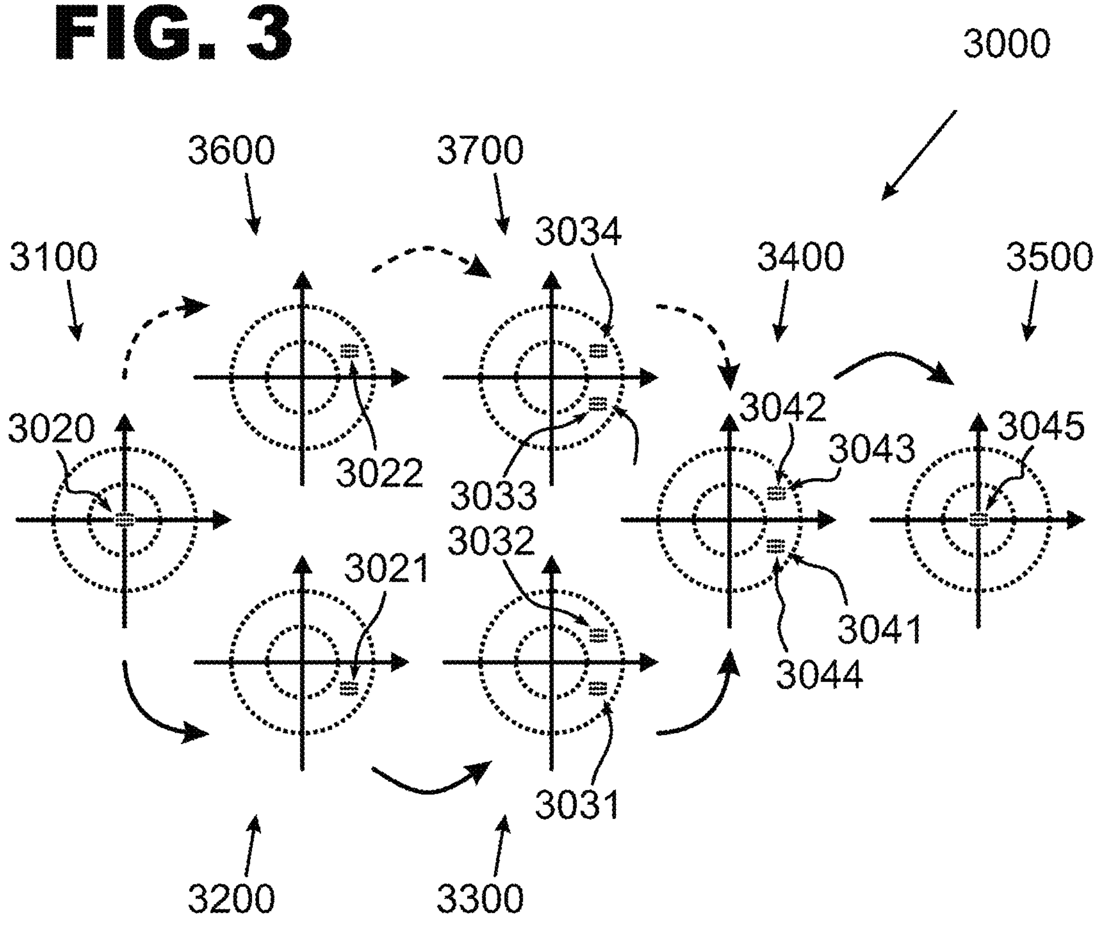
FIG. 3 illustrates a plurality of k-vector diagrams illustrating the effect of various diffraction events related to the operation of the display structure.

FIG. 1 depicts a partial orthographic top view of a display structure 1000 according to an embodiment, FIG. 2 shows a normalized k-vector diagram 2000 illustrating the operating principles of the display structure 1000, and FIG. 3 depicts a plurality of k-vector diagrams 3000 for further illustrating the effect of various diffraction events related to the operation of the display structure 1000. In other embodiments, a display structure may be identical, similar, or different to the display structure 1000 of the embodiment of FIGS. 1 to 3.

In the embodiment of FIGS. 1 to 3, the display structure 1000 comprises a waveguide 1100. In FIG. 1, the waveguide 1100 extends parallel to the plane of the figure.

In this disclosure, a "waveguide" may refer to an optical waveguide. Additionally or alternatively, a waveguide may refer to a two-dimensional waveguide, wherein light may be confined along a thickness direction of said waveguide. Additionally or alternatively, a waveguide may refer to a two-dimensional waveguide, wherein light may be confined between opposite faces of said waveguide by total internal reflection.

In the embodiment of FIGS. 1 to 3, the display structure 1000 comprises an in-coupling structure 1200.

Throughout this disclosure, an "in-coupling structure" may refer to a structure configured to couple a set of input beams into a waveguide for guided propagation therein. Generally, an in-coupling structure may comprise, for example, one or more diffractive optical elements, such as diffraction gratings; and/or one or more reflective optical elements, such as mirrors; and/or one or more refractive optical elements, such as prisms.

In the embodiment of FIGS. 1 to 3, the waveguide 1100 may have a refractive index of approximately 2 throughout the visible spectrum. In other embodiments, a waveguide may have any suitable refractive index with any suitable dispersive properties.

The waveguide 1100 may be surrounded by air with a refractive index of approximately 1 throughout the visible spectrum. Consequently, light may be guided within the waveguide 1100 between opposite air-glass interfaces. In other embodiments, light may be guided within a waveguide between any suitable interfaces, for example, air-glass interfaces.

As schematically depicted in FIG. 1, the in-coupling structure 1200 of the embodiment of FIGS. 1 to 3 is configured to couple a set of input beams 1020 into the waveguide 1100 as a set of in-coupled beams 1021.

Herein, a "set of input beams" may refer to a set of optical beams directed to an in-coupling structure and corresponding to an input image. Additionally or alternatively, a set of input beams may refer to a set of optical beams propagating towards an in-coupling structure of a display structure from a solid angle defining a field of view of said display structure. Additionally of alternatively, a set of input beams may refer to a set of optical beams associated with a set of input k-vectors lying in a coupling domain associated with a waveguide.

Further, a "set of in-coupled beams" may refer to a set of optical beams coupled into a waveguide by an in-coupling structure. Additionally or alternatively, a set of in-coupled beams may refer to a set of optical beams corresponding to an image and propagating in guided manner within a waveguide. Additionally of alternatively, a set of in-coupled beams may refer to a set of optical beams associated with a set of in-coupled k-vectors lying in a guided propagation domain associated with a waveguide.

Additionally of alternatively, a set of in-coupled beams and/or a set of input beams may correspond to a field of view of an image. The image may comprise, for example, an image to be displayed to a user.

The set of input beams 1020 and the set of in-coupled beams 1021 of the embodiment of FIGS. 1 to 3 are associated with a set of input k-vectors 3020 and a set of in-coupled k-vectors 3021, respectively.

In the plurality of k-vector diagrams 3000 of FIG. 3, the set of input k-vectors 3020 is schematically illustrated as a set of points in the first k-vector diagram 3100, the set of in-coupled k-vectors 3021 is schematically illustrated as a set of points in the second k-vector diagram 3200, and the coupling of the set of input beams 1020 into the waveguide 1100 as the set of in-coupled beams 1021 is represented schematically as an arrow extending from the first k-vector diagram 3100 to the second k-vector diagram 3200.

As is evident based on FIGS. 2 and 3, the set of input k-vectors 3020 and the set of in-coupled k-vectors 3021 lie in an in-coupling domain 2100 and in a first domain 2310, respectively. The first domain 2310 is situated in an annular guided propagation domain 2001 associated with the waveguide 1100, whereas the in-coupling domain 2100 lies in a coupling domain 2002 surrounded by the guided propagation domain 2001.

In the embodiment of FIGS. 1 to 3, the in-coupling domain 2100 is arranged centrally in the coupling domain 2002. In other embodiments, an in-coupling domain may be arranged in a coupling domain in any suitable manner, for example, centrally or off-centrally.

Herein, a "first domain" may refer to a domain in k-space situated within a guided propagation domain associated with a waveguide. Additionally or alternatively, a first domain may refer to a domain in k-space defined by a set of in-coupled k-vectors coupled into a waveguide by an in-coupling structure. Herein, "a domain in k-space defined by a set of in-coupled k-vectors" may refer to a smallest non-empty connected open set within a guided propagation domain associated with a waveguide comprising each of the points representing said set of in-coupled k-vectors.

In the embodiment of FIGS. 1 to 3, the display structure 1000 further comprises a diffractive exit pupil expansion structure 1300.

In this specification, a structure being "diffractive" may refer to said structure comprising a diffractive optical element. Herein, a "diffractive optical element", may refer to an optical element the operation of which is based on diffraction of light. Generally, a diffractive optical element may comprise structural features with at least one dimension of the order of the wavelengths of visible light, for example, at least one dimension less than one micrometer. Typical examples of diffractive optical elements include diffraction gratings, e.g., one- and two-dimensional diffraction gratings, which may be implemented as single-region diffraction gratings or as multi-region diffraction gratings. Diffraction gratings may generally be implemented, at least, as surface relief diffraction gratings or volume holographic diffraction gratings, and they may be configured to function as transmission- and/or reflection-type diffraction gratings.

Further, "exit pupil expansion", or "EPE, may refer to a process of distributing light within a waveguide in a controlled manner so as to expand the portion of said waveguide wherefrom out-coupling of light occurs. Generally, exit pupil expansion may be accomplished in waveguide-based display structure using so-called "pupil replication" schemes, wherein a plurality of exit sub-pupils are formed in an imaging system. Consequently, an "exit pupil expansion structure" may refer to a structure suitable or configured for exit pupil expansion, for example, by pupil replication.

As schematically depicted in FIG. 1, the exit pupil expansion structure 1300 of the embodiment of FIGS. 1 to 3 is configured to receive the set of in-coupled beams 1021 and to diffract the set of in-coupled beams 1021 to form a first set of guided beams 1031 and a second set of guided beams 1032.

When the set of in-coupled beams and/or the set of input beams correspond to a field of view of an image, the first set of guided beams 1031 and the second set of guided beams 1032 may also correspond to the field of view of the image. Thus, the exit pupil expansion structure 1300 can produce copies of the whole field of view of the image. Thus, the first set of guided beams 1031 and the second set of guided beams 1032 may comprise a copy of the whole field of view of the image.

In the embodiment of FIGS. 1 to 3, the first set of guided beams 1031 is associated with a first set of k-vectors 3031, and the second set of guided beams 1032 is associated with a second set of k-vectors 3032. In the plurality of k-vector diagrams 3000 of FIG. 3, the first set of k-vectors 3031 and the second set of k-vectors 3032 are depicted as sets of points in a third k-vector diagram 3300, and the diffraction of the set of in-coupled beams 1021 by the exit pupil expansion structure 1300 to form the first set of guided beams 1031 and the second set of guided beams 1032 is represented schematically as an arrow extending from the second k-vector diagram 3200 to the third k-vector diagram 3300. As shown in FIGS. 2 and 3, the first set of k-vectors 3031 lies in the first domain 2310, and the second set of k-vectors 3032 lies in a second domain 2320 disjoint with the first domain 2310 and arranged in the guided propagation domain 2001.

The first domain 2310 and the second domain 2320 of the embodiment of FIGS. 1 to 3 are arranged symmetrically with respect to the $k_x/k_0$ axis in the k-vector diagram 2000 of FIG. 2. In other embodiments, a first domain and a second domain may or may not be arranged symmetrically with respect to a line extending via an origin of a k-vector diagram associated with a waveguide. For example, in some embodiments, one of a first domain and a second domain may be arranged at a first radial distance from an origin of a k-vector diagram associated with a waveguide, and the other of said first domain and said second domain may be arranged at a second radial distance different to, i.e., greater or less than, said first radial distance from said origin.

The display structure 1000 of the embodiment of FIGS. 1 to 3 further comprises a diffractive out-coupling structure 1400.

In this disclosure, an "out-coupling structure" may refer to a structure configured to couple light out of a waveguide.

As schematically depicted in FIG. 1, the out-coupling structure 1400 of the embodiment of FIGS. 1 to 3 is configured to receive from the exit pupil expansion structure 1300 a first diffracted set of beams 1041 and a second diffracted set of beams 1042.

Throughout this specification, a "first diffracted set of beams" and a "second diffracted set of beams" may refer to sets of beams to be received by an out-coupling structure from an exit pupil expansion structure, wherein said first diffracted set of beams and said second diffracted set of beams may be associated with a first diffracted set of k-vectors lying in a first domain in k-space and second set of k-vectors lying in a second domain disjoint with said first domain, respectively. Additionally, or alternatively, a first diffracted set of beams" may refer to a set of beams comprising light from a set of in-coupled beams and/or light from a secondary set of in-coupled beams coupled into a waveguide by an in-coupling structure.

The first diffracted set of beams 1041 and a second diffracted set of beams 1042 are associated with a first diffracted set of k-vectors 3041 and a second diffracted set of k-vectors 3042, respectively. In the plurality of k-vector diagrams 3000 of FIG. 3, the first diffracted set of k-vectors 3041 and the second diffracted set of k-vectors 3042 are depicted as sets of points in a fourth k-vector diagram 3400, and the propagation of the first diffracted set of beams 1041 and the second diffracted set of beams 1042 from the exit pupil expansion structure 1300 to the out-coupling structure 1400 is represented schematically as an arrow extending from the third k-vector diagram 3300 to the fourth k-vector diagram 3400. As shown in FIGS. 2 and 3, the first diffracted set of k-vectors 3041 lies in the first domain 2310, and the second diffracted set of k-vectors 3042 lies in the second domain 2320.

In the embodiment of FIGS. 1 to 3, the out-coupling structure 1400 is further configured to couple light from the first diffracted set of beams 1041 and light from the second diffracted set of beams 1042 out of the waveguide 1100. Generally, an out-coupling structure being configured to outcouple light both from a first diffracted set of beams associated with a first diffracted set of k-vectors lying in a first domain in k-space and from a second diffracted set of beams associated with a second diffracted set of k-vectors lying in a second domain disjoint with said first domain may reduce optical losses related to exit pupil expansion.

In the plurality of k-vector diagrams 3000 of FIG. 3, k-vectors corresponding to light coupled out of the waveguide 1100 by the out-coupling structure 1400 is schematically illustrated as a set of points in a fifth k-vector diagram 3500, and the out-coupling of the light is represented schematically as an arrow extending from the fourth k-vector diagram 3400 to the fifth k-vector diagram 3500. As shown in FIGS. 2 and 3, k-vectors corresponding to light coupled out of the waveguide 1100 by the out-coupling structure 1400 lie in an out-coupling domain 2200 arranged in the coupling domain 2002.

In the embodiment of FIGS. 1 to 3, the out-coupling domain 2200 is arranged centrally in the coupling domain 2002. In other embodiments, an out-coupling domain may be arranged in a coupling domain in any suitable manner, for example, centrally or off-centrally. In some embodiments, an out-coupling domain may be aligned with an in-coupling domain.

In the normalized k-vector diagram 2000 of FIG. 2, the diffraction of the set of in-coupled beams 1021 by the exit pupil expansion structure 1300 is represented as a fundamental exit pupil expansion grating k-vector ($G^{EPE}$) extending from the first domain 2310 to the second domain 2320. As such, the exit pupil expansion structure 1300 is configured to diffract the set of in-coupled beams 1021 by zeroth-order diffraction to form the first set of guided beams 1031 and by first-order diffraction ($G^{EPE}$) to form the second set of guided beams 1032. Generally, an exit pupil expansion structure being configured to diffract a set of in-coupled beams by zeroth-order and first-order diffractions to form a first set of guided beams and a second set of guided beams may further facilitate reducing optical losses related to exit pupil expansion.

Herein, a "grating k-vector" may refer to a vector in k-space representing the effect of a diffractive optical element on the propagation direction of an optical beam represented by a k-vector. Additionally or alternatively, a grating k-vector associated with a diffractive optical element may refer to a vector in k-space that may be added to an in-plane component of a k-vector associated with an optical beam in order to represent the effect of said diffractive optical element on the propagation of said optical beam.

Generally, diffractive optical elements may be utilized for coupling optical beams into and/or out of a waveguide and/or for altering the propagation direction of said optical beams within said waveguide. The magnitudes and directions of a grating k-vector representing the effect of a diffractive optical element are determined by the properties of said diffractive optical element. In particular, a fundamental grating vector may be associated with each periodicity direction of a diffractive optical element, the direction and magnitude of each fundamental grating vector being determined by the direction and pitch of said diffractive optical element in its associated periodicity direction. Higher order grating vectors of a diffractive optical element may then be expressed as integer linear combinations of the fundamental grating vectors of a diffractive optical element. For example, assuming that a diffractive optical element has a first periodicity in a first direction and a second periodicity in a second direction, a first fundamental grating vector $G_1$ and a second fundamental grating vector $G_2$ may be associated with the first direction and the second direction, and higher order grating vectors, such as $G_1+G_2$, $G_1-G_2$, $-2G_1$, and $3G_2$, may be defined based on the fundamental grating vectors.

Throughout this specification, "Nth-order diffraction", e.g., first-order diffraction or second-order diffraction, may refer to positive Nth-order diffraction and/or negative Nth-order diffraction. Additionally or alternatively, a structure being configured to "diffract a set of beams by Nth-order diffraction" may refer to said structure being configured to diffract said set of beams in a manner representable by a grating k-vector $\pm NG^f$, wherein $G^f$ is a fundamental grating k-vector of a diffractive optical element of said structure.

In other embodiments, an exit pupil expansion structure may or may not be configured to diffract a set of in-coupled beams by zeroth-order and first-order diffractions to form a first set of guided beams and a second set of guided beams. For example, in some embodiments, an exit pupil expansion structure may be configured to diffract a set of in-coupled beams by zeroth-order diffraction to form a first set of guided beams and by second-order diffraction to form a second set of guided beams. In such embodiments, said exit pupil expansion structure may be configured to diffract said set of in-coupled beams by first-order diffraction to form a third set of guided beams associated with a third set of k-vectors lying in a third domain disjoint with each of a first domain and a second domain. In some such embodiments, an out-coupling structure may be configured to receive from said exit pupil expansion structure a third diffracted set of beams associated with a third diffracted set of k-vectors lying in said third domain and to couple light from light from said third diffracted set of beams out of a waveguide.

As schematically depicted in FIG. 1, the exit pupil expansion structure 1300 of the embodiment of FIGS. 1 to 3 is configured to further increase number of diffracted beams by diffracting the first set of guided beams 1031 and the second set of guided beams 1032. Generally, an exit pupil expansion structure being configured to further increase number of diffracted beams by diffracting a first set of guided beams and a second set of guided beams may facilitate reducing spatial image brightness variations throughout an out-coupling structure. In other embodiments, an exit pupil expansion structure may or may not be configured in such manner. For example, in some embodiments, an exit pupil expansion structure may be configured to suppress diffraction of a second set of guided beams by minimizing diffraction efficiency to specific diffraction order(s).

In the embodiment of FIGS. 1 to 3, the exit pupil expansion structure 1300 comprises a one-dimensional exit pupil expansion grating 1310 for diffracting the set of in-coupled beams 1021 to form the first set of guided beams 1031 and the second set of guided beams 1032. Generally, an exit pupil expansion structure comprising a one-dimensional exit pupil expansion grating may facilitate formation of said exit pupil expansion structure. Additionally or alternatively, an exit pupil expansion structure comprising a one-dimensional exit pupil expansion grating may facilitate directing light from a set of in-coupled beams towards specific diffraction orders in order to reduce optical losses related to exit pupil expansion.

In other embodiments, an exit pupil expansion structure may or may not comprise a one-dimensional exit pupil expansion grating. For example, in some embodiments, an exit pupil expansion structure may comprise a two-dimensional diffractive exit pupil expansion element. In some such embodiments, said exit pupil expansion element may have a primary periodicity along a primary direction for diffracting a set of in-coupled beams to form a first set of guided beams and a second set of guided beams and a secondary periodicity along a secondary direction different to the primary direction. In some such embodiments, said secondary periodicity may be defined by a pitch preventing diffraction of light received by said exit pupil expansion structure along said secondary direction.

In the embodiment of FIGS. 1 to 3, the first domain 2310 defines a first light guiding direction 1001, the second domain 2320 defines a second light guiding direction 1002, and a smallest angle ($\alpha$) between the first light guiding direction 1001 and the second light guiding direction 1002 is approximately 60°. Generally, a lower angle between a first light guiding direction and a second light guiding direction may reduce optical losses caused by light propagating past or across an out-coupling structure, whereas a higher angle between a first light guiding direction and a second light guiding direction may facilitate reducing size of an exit pupil expansion structure. In other embodiments, any suitable smallest angle, for example, a smallest angle greater than or equal to 45°, or to 55°, and/or less than or equal to 65°, or to 75°, may exist between a first light guiding direction and a second light guiding direction.

Herein, a domain in k-space situated within a guided propagation domain associated with a waveguide "defining a light guiding direction" may refer to said waveguide extending laterally along a plane and said domain comprising a characteristic point, e.g., centroid of said domain, defining said light guiding direction along said plane.

As schematically depicted in FIG. 1, the out-coupling structure 1400 of the embodiment of FIGS. 1 to 3 is configured to diffract the first diffracted set of beams 1041 and the second diffracted set of beams 1042 to form a first additional set of beams 1043 and a second additional set of beams 1044, respectively.

The first additional set of beams 1043 and a second additional set of beams 1044 are associated with a first additional set of k-vectors 3043 and a second additional set of k-vectors 3044, respectively. In the plurality of k-vector diagrams 3000 of FIG. 3, the first additional set of k-vectors 3043 and the second additional set of k-vectors 3044 are depicted in the fourth k-vector diagram 3400 as sets of points superimposed on the sets of points depicting the second diffracted set of k-vectors 3042 and the first diffracted set of k-vectors 3041, respectively. As shown in FIGS. 2 and 3, the first additional set of k-vectors 3043 lies in the second domain 2320, and the second additional set of k-vectors 3044 lies in the first domain 2310.

Generally, an out-coupling structure being configured to diffract a first diffracted set of beams and/or a second diffracted set of beams to form a first additional set of beams and/or a second additional set of beams, respectively, associated with a first additional set of k-vectors and/or a second additional set of k-vectors, respectively, lying in a second domain and/or a first domain, respectively, may facilitate reducing spatial image brightness variations throughout an out-coupling structure. In other embodiments, an out-coupling structure may or may not be configured in such manner.

In the embodiment of FIGS. 1 to 3, the out-coupling structure 1400 comprises a two-dimensional out-coupling grating 1410 having a first periodicity for coupling light from the first diffracted set of beams 1041 out of the waveguide 1100, a second periodicity for coupling light from the second diffracted set of beams 1042 out of the waveguide 1100, and a third periodicity for forming the first additional set of beams 1043 and the second additional set of beams 1044.

Generally, out-coupling structure comprising a two-dimensional out-coupling grating having a first periodicity for coupling light from a first diffracted set of beams out of a waveguide, a second periodicity for coupling light from a second diffracted set of beams out of said waveguide, and a third periodicity for forming a first additional set of beams and/or a second additional set of beams may enable forming an out-coupling structure with single-sided fabrication methods.

In other embodiments, an out-coupling structure may or may not comprise such a two-dimensional out-coupling grating. For example, in some embodiments, wherein an out-coupling structure is configured to diffract a first diffracted set of beams and/or a second diffracted set of beams to form a first additional set of beams and/or a second additional set of beams, respectively, said out-coupling structure may comprise at least two mutually at least partly laterally overlapping diffractive optical elements for coupling light from both a first diffracted set of beams and from a second diffracted set of beams out of a waveguide and for forming a first additional set of beams and/or a second additional set of beams.

In the normalized k-vector diagram 2000 of FIG. 2, the coupling of light from the first diffracted set of beams 1041 out of the waveguide 1100 is represented as a fundamental primary out-coupling grating k-vector $$(G_1^{OC})$$

extending from the first domain 2310 to the out-coupling domain 2200. Similarly, the coupling of light from the second diffracted set of beams 1042 out of the waveguide 1100 is represented as a fundamental secondary out-coupling grating k-vector $$(G_2^{OC})$$

extending from the second domain 2320 to the out-coupling domain 2200. As such, the out-coupling structure 1400 is configured to diffract light from the first diffracted set of beams 1041 and light from the second diffracted set of beams 1042 out of the waveguide 1100 by first-order diffraction $$(G_1^{OC}, G_2^{OC}).$$

In other embodiments, an out-coupling structure may or may not be configured to diffract light from a first diffracted set of beams and/or light from a second diffracted set of beams out of the waveguide by first-order diffraction.

Further, in the normalized k-vector diagram 2000 of FIG. 2, the diffraction of the first diffracted set of beams 1041 to form the first additional set of beams 1043 is represented as a fundamental tertiary out-coupling grating k-vector $$(G_3^{OC})$$

extending from the first domain 2310 to the second domain 2320. Correspondingly, the diffraction of the second diffracted set of beams 1042 to form the second additional set of beams 1044 could be represented by the inverse of $$G_3^{OC},$$

i.e., $$-G_3^{OC},$$

which extends from the second domain 2320 to the first domain 2310. As such, the out-coupling structure 1400 is configured to diffract the first diffracted set of beams 1041 and the second diffracted set of beams 1042 to form the first additional set of beams 1043 and the second additional set of beams 1044, respectively, by first-order diffraction $$(G_3^{OC}, -G_3^{OC}).$$

In other embodiments, an out-coupling structure may or may not be configured to diffract a first diffracted set of beams and a second diffracted set of beams to form a first additional set of beams and a second additional set of beams, respectively, by first-order diffraction.

As indicated schematically in FIG. 1 by the straight solid arrow extending from the in-coupling structure 1200 via the exit pupil expansion structure 1300 to the out-coupling structure 1400, the in-coupling structure 1200 is configured to couple the set of input beams 1020 into the waveguide 1100 such that light from the set of in-coupled beams 1021 is guided to the out-coupling structure 1400 without being subjected to non-zeroth-order diffractions. Generally, an in-coupling structure being configured in such manner may further reduce optical losses related to exit pupil expansion.

In other embodiments, an in-coupling structure may or may not be configured to couple a set of input beams into a waveguide such that light from a set of in-coupled beams is guided to an out-coupling structure without being subjected to non-zeroth-order diffractions. For example, in some embodiments, an in-coupling structure may be configured to couple a set of input beams into a waveguide such that light from a set of in-coupled beams, which is guided solely by non-zeroth-order diffractions, is guided past an exit pupil expansion structure. Such arrangement may generally facilitate reducing spatial image brightness variations throughout an out-coupling structure.

As indicated in FIG. 1 schematically by a dashed arrow extending from the in-coupling structure 1200, the in-coupling structure 1200 of the embodiment of FIGS. 1 to 3 may be configured to couple the set of input beams 1020 into the waveguide 1100 as a secondary set of in-coupled beams 1022.

The secondary set of in-coupled beams 1022 of the embodiment of FIGS. 1 to 3 may be associated with a secondary set of in-coupled k-vectors 3022. In the plurality of k-vector diagrams 3000 of FIG. 3, the secondary set of in-coupled k-vectors 3022 is schematically illustrated as a set of points in a sixth k-vector diagram 3600, and the coupling of the set of input beams 1020 into the waveguide 1100 as the secondary set of in-coupled beams 1022 is represented schematically as a dashed arrow extending from the first k-vector diagram 3100 to the sixth k-vector diagram 3600. As shown on FIGS. 2 and 3, the secondary set of in-coupled k-vectors 3022 lies in in the second domain 2320.

In other embodiments, an in-coupling structure may or may not be configured to couple a set of input beams into a waveguide as a secondary set of in-coupled beams associated with a secondary set of in-coupled k-vectors lying in a second domain.

Generally, a display structure and/or any part(s) thereof may or may not be configured to control propagation of light from a secondary set of in-coupled beams in manners corresponding with manners in which propagation of light from a set of in-coupled beams is controlled.

For example, as shown schematically in FIG. 1 using dashed arrows, the diffractive exit pupil expansion structure 1300 may be configured to receive the secondary set of in-coupled beams 1022 and to diffract the secondary set of in-coupled beams 1022 to form a first secondary set of guided beams 1033 and a second secondary set of guided beams 1034.

The first secondary set of guided beams 1033 and the second secondary set of guided beams 1034 may be associated with a first secondary set of k-vectors 3033 and a second secondary set of k-vectors 3034, respectively. In the plurality of k-vector diagrams 3000 of FIG. 3, the first secondary set of k-vectors 3033 and the second secondary set of k-vectors 3034 are depicted as sets of points in a seventh k-vector diagram 3700, and the diffraction of the secondary set of in-coupled beams 1022 by the exit pupil expansion structure 1300 to form the first secondary set of guided beams 1033 and the second secondary set of guided beams 1034 is represented schematically as a dashed arrow extending from the sixth k-vector diagram 3600 to the seventh k-vector diagram 3700.

Generally, a diffractive exit pupil expansion structure being configured to receive a secondary set of in-coupled beams from an in-coupling structure and to diffract said secondary set of in-coupled beams to form a first secondary set of guided beams and a second secondary set of guided beams associated with a first secondary set of k-vectors and a second secondary set of k-vectors, respectively, lying in a first domain and a second domain, respectively, may facilitate reducing spatial image brightness variations throughout an out-coupling structure.

In other embodiments, wherein an in-coupling structure is configured to couple a set of input beams into a waveguide as a secondary set of in-coupled beams associated with a secondary set of in-coupled k-vectors lying in a second domain, an exit pupil expansion structure may or may not be configured to receive said secondary set of in-coupled beams and to diffract said secondary set of in-coupled beams to form a first secondary set of guided beams and a second secondary set of guided beams associated with a first secondary set of k-vectors and a second secondary set of k-vectors, respectively, lying in a first domain and a second domain, respectively.

In the normalized k-vector diagram 2000 of FIG. 2, the diffraction of the secondary set of in-coupled beams 1022 by the exit pupil expansion structure 1300 could be represented by the inverse of $G^{EPE}$, i.e., $-G^{EPE}$. Consequently, the exit pupil expansion structure 1300 is configured to diffract the secondary set of in-coupled beams 1022 by first-order diffraction ($-G^{EPE}$) to form the first secondary set of guided beams 1033 and by zeroth-order diffraction to form the second secondary set of guided beams 1034. In other embodiments, an exit pupil expansion structure may or may not be configured to diffract a secondary set of in-coupled beams by first-order diffraction to form a first secondary set of guided beams and by zeroth-order diffraction to form a second secondary set of guided beams.

In the embodiment of FIGS. 1 to 3, the in-coupling structure 1200 comprises an in-coupling grating 1210 for coupling the set of input beams 1020 into the waveguide 1100. In other embodiments, an in-coupling structure may or may not comprise such in-coupling grating. For example, in some embodiments, an in-coupling structure may comprise one or more reflective optical elements, such as mirrors, and/or one or more refractive optical elements, such as prisms, in addition to or as an alternative to an in-coupling grating.

The in-coupling grating 1210 of the embodiment of FIGS. 1 to 3 may be implemented as a two-dimensional grating configured to couple the set of input beams 1020 into the waveguide 1100 as the set of in-coupled beams 1021 and as the secondary set of in-coupled beams 1022. Generally, an in-coupling structure comprising a two-dimensional in-coupling grating for coupling a set of input beams into a waveguide as a set of in-coupled beams and as a secondary set of in-coupled beams may facilitate reducing spatial image brightness variations throughout an out-coupling structure. In other embodiments, wherein an in-coupling structure is configured to couple a set of input beams into a waveguide as a secondary set of in-coupled beams associated with a secondary set of in-coupled k-vectors lying in a second domain, said in-coupling structure may or may not comprise a two-dimensional in-coupling grating. For example, in some embodiments, an in-coupling structure may comprise a first in-coupling element, e.g., a diffractive, reflective, or refractive optical element, for coupling a set of input beams into a waveguide as a set of in-coupled beams and a second in-coupling element, e.g., a diffractive, reflective, or refractive optical element, for coupling said set of input beams into said waveguide as a secondary set of in-coupled beams. In such embodiments, said first in-coupling element and said second in-coupling element may or may not be arranged to laterally overlap one another at least partly.

In the normalized k-vector diagram 2000 of FIG. 2, the coupling of the set of input beams 1020 into the waveguide 1100 as the set of in-coupled beams 1021 is represented as a fundamental primary in-coupling grating k-vector $$(G_1^{IC})$$

extending from the in-coupling domain 2100 to the first domain 2310, whereas the coupling of the set of input beams 1020 into the waveguide 1100 as secondary set of in-coupled beams 1022 is represented as a fundamental secondary in-coupling grating k-vector $$(G_2^{IC})$$

extending from the in-coupling domain 2100 to the second domain 2320. As such, the in-coupling structure 1200 is configured to diffract the set of input beams 1020 by first-order diffraction $$(G_1^{IC}, G_2^{IC})$$

to form the set of in-coupled beams 1021 and the secondary set of in-coupled beams 1022. In other embodiments, an in-coupling structure may or may not be configured to diffract a set of input beams by first-order diffraction to form a set of in-coupled beams and/or a secondary set of in-coupled beams.

In the embodiment of FIGS. 1 to 3, the in-coupling grating 1210, the exit pupil expansion grating 1310, and the out-coupling grating 1410 are arranged symmetrically with respect a fictitious transverse plane 1003 extending along to a thickness direction of the waveguide 1100. In FIG. 1, the transverse plane 1003 extends perpendicular to the plane of the figure. In other embodiments, an in-coupling grating, an exit pupil expansion grating, and an out-coupling grating may or may not be arranged symmetrically with respect to a transverse plane extending along to a thickness direction of a waveguide.

Any diffractive optical element(s) in the display structure 1000, including the in-coupling grating 1210, the exit pupil expansion grating 1310, and the out-coupling grating 1410, may be formed at least partly using nanoimprint lithography. In other embodiments, any suitable fabrication method(s), for example, nanoimprint lithography and/or electron-beam lithography, may be used.

It is to be understood that the embodiments of the first aspect described above may be used in combination with each other. Several of the embodiments may be combined together to form a further embodiment.

Above, mainly features related to display structures are discussed. In the following, more emphasis will lie on aspects related to display devices. What is said above about the ways of implementation, definitions, details, and advantages applies, mutatis mutandis, to the display devices discussed below. The same applies vice versa.

Figure 4:
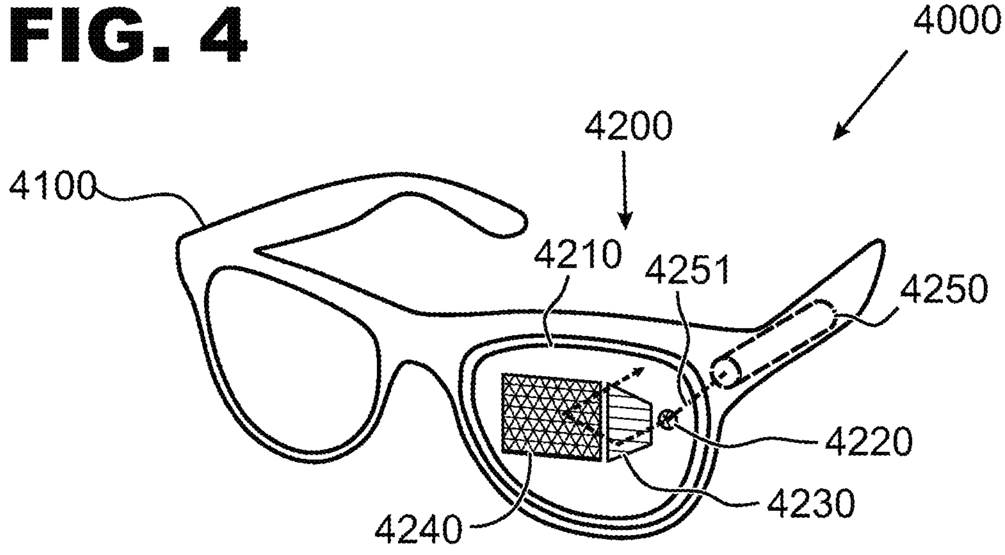
FIG. 4 shows a display device.

FIG. 4 depicts a display device 4000 according to an embodiment. The embodiment of FIG. 4 may be in accordance with any of the embodiments disclosed with reference to or in conjunction with any of FIGS. 1 to 3. Additionally or alternatively, although not explicitly shown in FIG. 4, the embodiment of FIG. 4 or any part thereof may generally comprise any features and/or elements of the embodiment of FIGS. 1 to 3.

In the embodiment of FIG. 4, the display device 4000 is implemented as a head-mounted see-through display device, more specifically, as spectacles comprising a see-through display. In other embodiments, a display device may be implemented in any suitable manner, for example, as a portable display device and/or as a vehicular display device, which may or may not be further implemented as a see-through display device. In some embodiments, a display device may be implemented specifically as a head-mounted display device.

Herein, a "head-mounted display device" may refer to a portable display device configured to be worn on the head, as part of a piece of headgear, and/or on or over the eyes. Generally, a head-mounted display device may or may not be implemented as a see-through display device and/or as a vehicular display device.

In the embodiment of FIG. 4, the display device 4000 comprises a frame 4100 and a display structure 4200 according to the first aspect supported by the frame 4100. The display structure 4200 comprises a waveguide 4210, an in-coupling structure 4220, an exit pupil expansion structure 4230, and an out-coupling structure 4240. In other embodiments, display device may or may not comprise a frame for supporting a display structure.

As shown in FIG. 4, the display device 4000 further comprises an optical engine 4250 configured to direct light 4251 to be coupled into the waveguide 4210 to the in-coupling structure 4220. In other embodiments, a display device may or may not comprise such optical engine.

Figure 5:
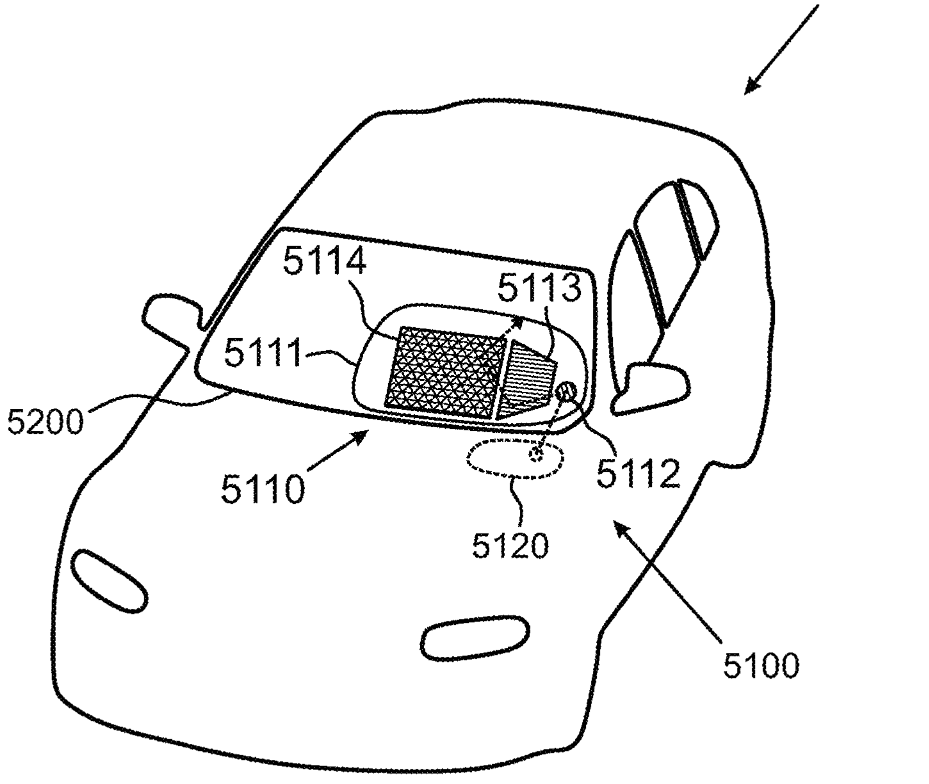
FIG. 5 depicts a vehicle.

FIG. 5 schematically depicts a vehicle 5000 according to an embodiment. In the embodiment of FIG. 5, the vehicle 5000 is implemented as a car. In other embodiments, a vehicle may or may not be implemented as a car. For example, in some embodiments, a vehicle may be implemented as a motor vehicle, such as a car, a truck, a motorcycle, or a bus; a railed vehicle, such as a train or a tram; a piece of heavy machinery, such as a tractor or a harvester; a watercraft, such as a ship or a boat; an aircraft, such as an airplane or helicopter; or a spacecraft, such as a space capsule or a spaceplane.

In the embodiment of FIG. 5, the vehicle 5000 comprises a vehicular display device 5100 in accordance with the second aspect. Even if not explicitly shown in FIG. 5, the embodiment of FIG. 5 or any part thereof may generally comprise any features and/or elements disclosed with reference to or in conjunction with any of FIGS. 1 to 4.

The vehicular display device 5100 of the embodiment of FIG. 5 comprises a display structure 5110 in accordance with the first aspect and an optical engine 5120. The display structure 5110 comprises a waveguide 5111, an in-coupling structure 5112, an exit pupil expansion structure 5113, and an out-coupling structure 5114. In other embodiments, a vehicular display device may or may not comprise an optical engine.

The vehicular display device 5100 of the embodiment of FIG. 5 is implemented as a head-up display device. In other embodiments, a display device may or may not be implemented as a head-up display device.

Herein, a "head-up display device" may refer to a see-through vehicular display device configured to present images and/or data to a steerer, e.g., a driver or a pilot, of a vehicle without requiring said steerer to look away from usual viewpoints thereof. Generally, a head-up display device may or may not be implemented as a vehicle-mounted display device.

In the embodiment of FIG. 5, the vehicle 5000 further comprises a laminated window 5200, and the waveguide 5111 extends within the window 5200. In other embodiments, one or more waveguides may be arranged in any suitable manner(s). In some embodiments, a waveguide may extend within a laminated window, such as a windshield. In some embodiments, a vehicle may comprise a vehicular display device comprising a waveguide arranged at a distance from a window.

It is obvious to a person skilled in the art that with the advancement of technology, the basic idea of the invention may be implemented in various ways. The invention and its embodiments are thus not limited to the examples described above, instead they may vary within the scope of the claims.

It will be understood that any benefits and advantages described above may relate to one embodiment or may relate to several embodiments. The embodiments are not limited to those that solve any or all of the stated problems or those that have any or all of the stated benefits and advantages.

The term "comprising" is used in this specification to mean including the feature(s) or act(s) followed thereafter, without excluding the presence of one or more additional features or acts. It will further be understood that reference to 'an' item refers to one or more of those items.

REFERENCE SIGNS $k=k\hat{v}$ k-vector
α angle
k wavenumber
n refractive index
$\hat{v}$ unit vector $G_1^{IC}$ primary in-coupling grating k-vector $G_2^{IC}$ secondary in-coupling grating k-vector
$G^{EPE}$ exit pupil expansion grating k-vector $G_1^{OC}$ primary out-coupling grating k-vector $G_2^{OC}$ secondary out-coupling grating k-vector $G_3^{OC}$ tertiary out-coupling grating k-vector
1000 display structure
1001 first light guiding direction
1002 second light guiding direction
1003 transverse plane
1020 set of input beams
1021 set of in-coupled beams
1022 secondary set of in-coupled beams
1031 first set of guided beams
1032 second set of guided beams
1033 first secondary set of guided beams
1034 second secondary set of guided beams
1041 first diffracted set of beams
1042 second diffracted set of beams

1043 first additional set of beams
1044 second additional set of beams
1100 waveguide
1200 in-coupling structure
1210 in-coupling grating
1300 exit pupil expansion structure
1310 exit pupil expansion grating
1400 out-coupling structure
1410 out-coupling grating
2000 k-vector diagram
2001 guided propagation domain
2002 coupling domain
2100 in-coupling domain
2200 out-coupling domain
2310 first domain
2320 second domain
3000 plurality of k-vector diagrams
3020 set of input k-vectors
3021 set of in-coupled k-vectors
3022 secondary set of in-coupled k-vectors
3031 first set of k-vectors
3032 second set of k-vectors
3033 first secondary set of k-vectors
3034 second secondary set of k-vectors
3041 first diffracted set of k-vectors
3042 second diffracted set of k-vectors
3043 first additional set of k-vectors
3044 second additional set of k-vectors
3100 first k-vector diagram
3200 second k-vector diagram
3300 third k-vector diagram
3400 fourth k-vector diagram
3500 fifth k-vector diagram
3600 sixth k-vector diagram
3700 seventh k-vector diagram
4000 display device
4100 frame
4200 display structure
4210 waveguide
4220 in-coupling structure
4230 exit pupil expansion structure
4240 out-coupling structure
4250 optical engine
4251 light
5000 vehicle
5100 vehicular display device
5110 display structure
5111 waveguide
5112 in-coupling structure
5113 exit pupil expansion structure
5114 out-coupling structure
5120 optical engine
5200 window

The invention claimed is:

1. A display structure, comprising:

a waveguide;

an in-coupling structure configured to couple a set of input beams into the waveguide as a set of in-coupled beams associated with a set of in-coupled k-vectors defining a first domain in k-space in an annular guided propagation domain associated with the waveguide; and a diffractive exit pupil expansion structure configured to receive the set of in-coupled beams and to diffract the set of in-coupled beams to form a first set of guided beams and a second set of guided beams associated with a first set of k-vectors and a second set of k-vectors, respectively, lying in the first domain and in a second domain disjoint with the first domain, respectively;

wherein the display structure further comprises a diffractive out-coupling structure configured to receive from the exit pupil expansion structure a first diffracted set of beams and a second diffracted set of beams associated with a first diffracted set of k-vectors and a second diffracted set of k-vectors, respectively, lying in the first domain and the second domain, respectively; and the out-coupling structure is configured to couple light from the first diffracted set of beams and light from the second diffracted set of beams out of the waveguide.

2. The display structure according to claim 1, wherein the exit pupil expansion structure is configured to diffract the set of in-coupled beams by zeroth-order and first-order diffractions to form the first set of guided beams and the second set of guided beams.

3. The display structure according to claim 1, wherein the exit pupil expansion structure is configured to further increase number of diffracted beams by diffracting the first set of guided beams and the second set of guided beams.

4. The display structure according to claim 1, wherein the exit pupil expansion structure comprises a one-dimensional exit pupil expansion grating for diffracting the set of in-coupled beams to form the first set of guided beams and the second set of guided beams.

5. The display structure according to claim 1, wherein the first domain defines a first light guiding direction, the second domain defines a second light guiding direction, and a smallest angle, a, between the first light guiding direction and the second light guiding direction is greater than or equal to 45°, or to 55°, and less than or equal to 65°, or to 75°.

6. The display structure according to claim 1, wherein the out-coupling structure is further configured to diffract the first diffracted set of beams and the second diffracted set of beams to form a first additional set of beams and a second additional set of beams, respectively, associated with a first additional set of k-vectors and a second additional set of k-vectors, respectively, lying in the second domain and the first domain, respectively.

7. The display structure according to claim 6, wherein the out-coupling structure comprises a two-dimensional out-coupling grating having a first periodicity for coupling light from the first diffracted set of beams out of the waveguide, a second periodicity for coupling light from the second diffracted set of beams out of the waveguide, and a third periodicity for forming the first additional set of beams and the second additional set of beams.

8. The display structure according to claim 1, wherein the in-coupling structure is configured to couple the set of input beams into the waveguide such that light from the set of in-coupled beams is guided to the out-coupling structure without being subjected to non-zeroth-order diffractions.

9. The display structure according to claim 1, wherein the in-coupling structure is further configured to couple the set of input beams into the waveguide as a secondary set of in-coupled beams associated with a secondary set of in-coupled k-vectors lying in the second domain, and the exit pupil expansion structure is configured to receive the secondary set of in-coupled beams and to diffract the secondary set of in-coupled beams to form a first secondary set of guided beams and a second secondary set of guided beams associated with a first secondary set of k-vectors and a second secondary set of k-vectors, respectively, lying in the first domain and the second domain, respectively.

10. The display structure according to claim 9, wherein the in-coupling structure comprises a two-dimensional in-coupling grating for coupling the set of input beams into the waveguide as the set of in-coupled beams and as the secondary set of in-coupled beams.

11. A display device comprising the display structure in accordance with claim 1.

12. The display device according to claim 11 implemented as a see-through display device.

13. The display device according to claim 11 implemented as a portable display device.

14. The display device according to claim 11 implemented as a vehicular display device.

15. A vehicle comprising the vehicular display device in accordance with claim 14.

* * * * *